July 23, 1940.　　　　P. J. TOEWS　　　　2,208,874
DOUGHNUT MACHINE
Filed Oct. 26, 1936

Inventor
Peter J. Toews
By Caswell & Lagaard
Attorneys

Patented July 23, 1940

2,208,874

UNITED STATES PATENT OFFICE 2,208,874

DOUGHNUT MACHINE

Peter J. Toews, Minneapolis, Minn.

Application October 26, 1936, Serial No. 107,609

11 Claims. (Cl. 53—7)

My invention relates to doughnut machines and particularly to that type of doughnut machine in which the doughnuts are progressed along a channel by the flow of the cooking liquid, such flow being caused by means of a propeller, pump or other flow impelling device.

In such machines in order to remove the flow impelling device from the portion of the channel through which the doughnuts travel the same is placed between the device which deposits the raw doughnuts into the channel and the device which removes the fried doughnuts therefrom. The force of the cooking liquid in the direction of flow is, therefore, greatest where the raw doughnuts are deposited. The doughnuts when deposited being soft are easily distorted by the force of the cooking liquid with the result that ovular or flattened doughnuts are produced. With such machines undercurrents may also be formed immediately following the flow impelling device with the result that doughnuts upon reaching the bottom of the channel are not always progressed and when rising may strike other doughnuts subsequently deposited and cause jambing of the machine.

An object of the invention resides in providing a doughnut machine in which the above noted objections are eliminated.

A still further object of the invention resides in providing a doughnut machine of the liquid flow propulsion type in which perfectly formed doughnuts are produced.

Another object of the invention resides in providing a doughnut machine of such character in which the doughnuts are regularly and positively progressed from the depositing device and along the channel.

Other objects of the invention reside in the novel combination and arrangement of parts and in the details of construction hereinafter illustrated and/or described.

Figure 1:
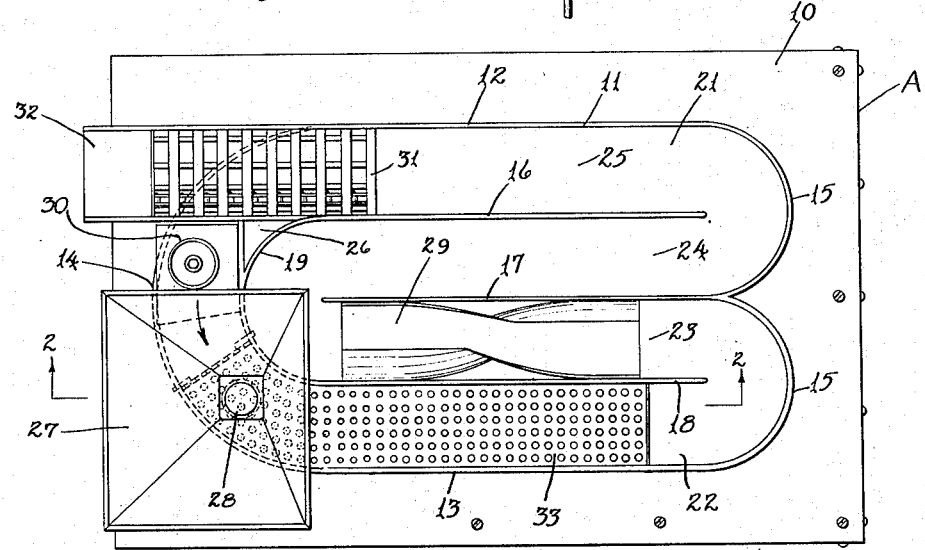
Fig. 1 is a plan view of a doughnut machine illustrating an embodiment of my invention applied thereto.

In order to more fully explain the operation and use of my invention, I have shown in Fig. 1 a doughnut machine indicated in its entirety by the reference numeral A. This doughnut machine includes a table 10 which has formed in it a pan or receptable indicated by the reference numeral 11. This pan is constructed with longitudinal walls 12 and 13 and arcuate end walls 14 and 15 connected therewith. Intermediate the walls 12 and 13 are provided partition walls 16, 17 and 18 of which the wall 18 is connected to the wall 15. The two walls 16 and 18 are connected together by means of an arcuate end wall 19. All of these walls are connected to a bottom 20. By means of this construction a continuous elongated passageway or channel 21 is provided which has branches 22, 23, 24, 25 and 26 all connected together and disposed in continuation of one another.

At the end of the branch 26 of channel 21 is situated a dough hopper 27 in which raw dough is placed and from which the dough is discharged into said channel. Annular portions of dough are severed from the dough contained within the hopper and discharged by means of a dough cutter 28 into the branch 26 at the proper locality. Such device forming no particular feature of this invention has not been shown in detail in the drawing, though it can readily be comprehended that any suitable construction may be employed for the purpose. In the branch 26 is also provided a flow impelling device 30 which may consist of a pump, propeller or any other suitable device, such as is now well known for the purpose and which causes flow of the cooking liquid contained within the channel 21 in the direction indicated by the arrow. In the branch 23 is provided a turnover device 29 which is in the nature of a twisted tube and which through the action of the flow of cooking liquid inverts the doughnuts so that when the doughnuts reach branch 24 of channel 21 the same travel through the remainder of the channel in an inverted position. At the end of the branch 25 is an upwardly inclined conveyor 31 which removes the fried doughnuts from the doughnut machine and discharges the same therefrom by means of a spout or chute 32.

The invention proper includes an elongated perforated plate 33 which I have termed a drop plate and a perforated baffle 34 extending upwardly therefrom. This structure is positioned within the branch 22 of the channel 21 between the walls 13 and 18 and the walls 14 and 19. The drop plate 33 is curved, as designated at 35 to fit around the curved walls 14 and 19 and the baffle 34 extends upwardly therefrom to the upper edge of said walls, being disposed rearwardly of the cutter 28. The baffle 34 is provided with a plurality of spaced openings 36 through which the cooking liquid may travel while the plate 33 is similarly constructed with a plurality of spaced openings 37 serving a like purpose. This drop plate divides the channel 21 into an upper passageway 21U and a lower passageway 21L.

Figure 2:
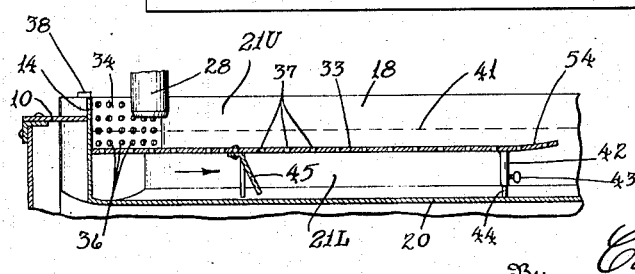
Fig. 2 is a longitudinal sectional view taken on line 2—2 of Fig. 1.

The drop plate 33 is supported in the following manner: Attached to the uppermost edge of the baffle 34 are two lugs 38 and 39. These lugs overreach the walls 14 and 19 of the receptacle 11 and rest thereon, holding the rearward end of the drop plate at a predetermined position below the level of the cooking liquid which is indicated by the dotted line 41 in Fig. 2. The other end of said drop plate has attached to it by welding or otherwise a depending tubular post 42 which is tapped to receive a thumb screw 43. Slidably mounted in the tubular post 42 is a rod 44 which rests upon the bottom 20 of the pan 11 and serves as a leg for supporting the forward end of the said drop plate.

Intermediate the ends of the drop plate 33 is provided a dam 45. This dam is constructed from a sheet of metal bent along a line 46 to form a body portion 47 and a flange 48 extending outwardly therefrom. The flange 48 is connected to the drop plate 33 by means of rivets 49 and the body 47 depends therefrom. In the body 47 are constructed two slits 51 which form a valve member 52 adapted to be bent outwardly from the body proper to provide openings 53 in the dam through which the cooking liquid may pass. The bottom of the dam 45 is spaced slightly above the bottom 20 of the pan 11 so that the forward portion 54 of the drop plate 33 may be raised and lowered.

As previously stated when a doughnut machine of the flow type is used the flow impelling device is usually positioned in close proximity to the device for depositing the doughnuts or the doughnut cutter. In such case the force of the cooking liquid is greatest where the doughnuts are deposited and frequently doughnuts of flattened or irregular shape are produced. The present invention is situated so that the doughnuts are deposited immediately above the curved portion 35 of said drop plate and in front of the baffle 34 which serves as a retarding means for reducing the rate of flow immediately following the same. The doughnuts hence do not sink down to the bottom of the branch 22 of channel 21 but are maintained a short distance below the level 41 of the cooking liquid. The baffle 34, the drop plate 33 and the dam 45 serve as flow controlling means for controlling the rate of flow of the cooking liquid in the passageway 21U. By means of the dam 45 and the perforations 36 and 37 in the baffle 34 and in the drop plate 33 the cooking liquid is caused to travel partly through said baffle 34 in the direction of propulsion at a reduced rate and partly upwardly through the drop plate in a manner to tend to raise the doughnut from its position resting upon the same. In this manner as soon as the doughnut is sufficiently buoyant the same is immediately raised from the drop plate and progressed along the channel. The rate of travel of the doughnut along the drop plate may be controlled by raising and lowering the forward end 54 of the drop plate by means of the adjusting screw 43. In this manner the doughnuts can be made to travel freely along the drop plate and due to the reduction of the force of the cooking liquid by its passage through the openings 36 and 37 distortion of the doughnut is entirely prevented. By means of the valve 52 the amount of cooking liquid passing upwardly through the openings 37 can be controlled so that the desired raising effect can be readily procured. After the device has once been adjusted the same need never be readjusted so that the desired results can be procured merely by bending the valve 52. It can readily be comprehended that if desired a hinge may be used in place of the structure shown whereby the valve can be adjusted with less effort.

Figures 3, 4:
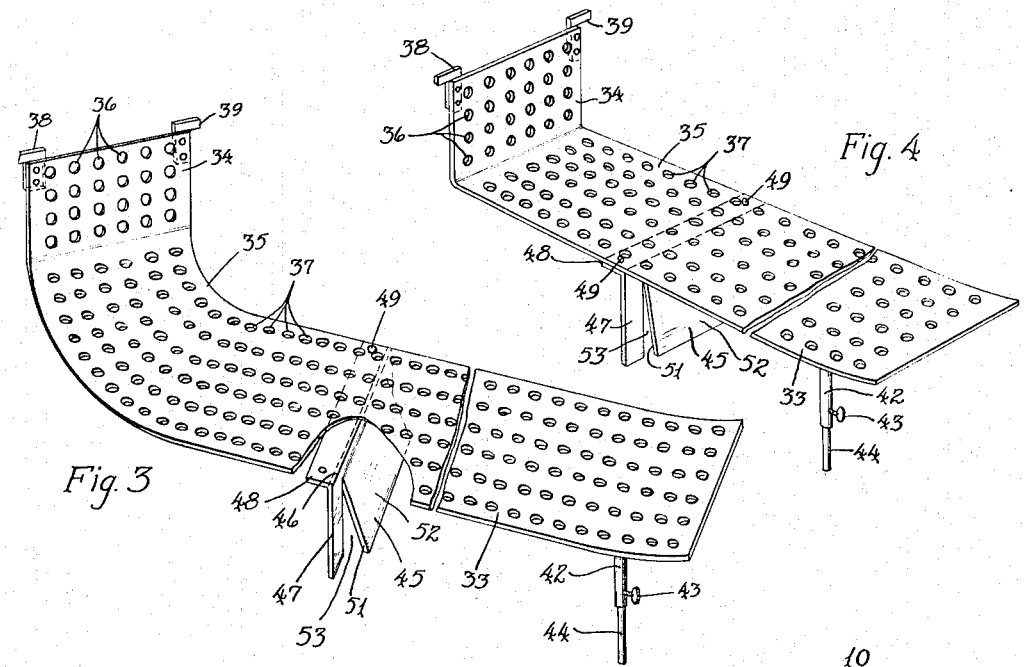
Fig. 3 is a perspective view of the drop plate and attached parts removed from the doughnut machine.
Fig. 4 is a perspective view similar to Fig. 3 of a modification of the invention.

In Fig. 4 I have shown a modification of the invention in which the device is desired for use in a straight branch of the channel containing the cooking liquid. In such case the curved portion 35 is omitted and the baffle extends crosswise of the drop plate and at right angles thereto. The construction shown in Fig. 4 being otherwise the same as that previously described, will not be again described and the same reference numerals will be used to designate corresponding parts.

My invention is highly advantageous in that an extremely simple and practical device is provided whereby perfectly formed doughnuts are produced which are delivered regularly and caused to travel at the proper rate of speed from the dough depositing means. My invention does not require any moving parts and once the device has been installed the same will continue to function indefinitely.

Changes in the specific form of my invention, as herein disclosed, may be made within the scope of what is claimed without departing from the spirit of my invention.

Having described my invention, what I claim as new and desire to protect by Letters Patent is:

1. In a doughnut machine, a trough having a bottom and forming a channel for the reception of a cooking liquid of a depth greater than the thickness of a doughnut, means for causing flow of the cooking liquid along said channel, a reticuate drop plate in said channel disposed below the level of the liquid and spaced from said bottom, and means for depositing raw doughnuts in the liquid above said drop plate.

2. In a doughnut machine, a trough having a bottom and forming a channel for the reception of a cooking liquid of a depth greater than the thickness of a doughnut, means for causing flow of the cooking liquid along said channel, a stationary reticulate drop plate in said channel disposed below the level of the liquid and spaced from said bottom, and means for depositing raw doughnuts in the liquid above said drop plate.

3. In a doughnut machine, a trough having a bottom and forming a channel for the reception of a cooking liquid of a depth greater than the thickness of a doughnut, means for causing flow of the cooking liquid along said channel, a drop plate in said channel extending in the direction of flow and disposed beneath the surface of the liquid in spaced relation to said bottom, a baffle extending upwardly from said drop plate at a locality upstream of the downstream end of said drop plate, and means for depositing raw doughnuts in the liquid above said drop plate and at a locality on the downstream side of the said baffle.

4. In a doughnut machine, a trough having a bottom and forming a channel for the reception of a cooking liquid of a depth greater than the thickness of a doughnut, means for causing flow of the cooking liquid along said channel, a drop plate in said channel extending in the direction of flow and disposed beneath the surface of the liquid in spaced relation to said bottom, a baffle extending upwardly from said drop plate at a locality upstream of the downstream end of said drop plate, both said drop plate and baffle being reticulate, and means for depositing raw doughnuts in the liquid above said drop plate and at a locality on the downstream side of said baffle.

5. In a doughnut machine, a trough having a bottom and forming a channel for the reception of a cooking liquid of a depth greater than the thickness of a doughut, means for causing flow of the cooking liquid along said channel, a drop plate in said channel disposed below the level of the liquid in spaced relation to said bottom and extending in the direction of flow of the cooking liquid, means for adjustably supporting the down stream end of said plate above the bottom, and means for depositing raw doughnuts in the cooking liquid above the drop plate.

6. In a doughnut machine, a trough having a bottom and forming a channel for the reception of a cooking liquid of a depth greater than the thickness of a doughnut, means for causing flow of the cooking liquid along said channel, a reticulate drop plate in said channel disposed below the level of the cooking liquid and spaced from said bottom, means beneath said drop plate for forcing the cooking liquid upwardly through the drop plate, and means for depositing raw doughnuts in the cooking liquid above said drop plate.

7. In a doughnut machine, a trough having a bottom and forming a channel for the reception of a cooking liquid of a depth greater than the thickness of a doughnut, means for causing flow of the cooking liquid along said channel, a reticulate drop plate in said channel disposed below the level of the cooking liquid and spaced from said bottom, a dam beneath said drop plate operating to force the cooking liquid upwardly through said drop plate, and means for depositing raw doughnuts in the cooking liquid above said drop plate.

8. In a doughnut machine, a trough having a bottom and forming a channel for the reception of a cooking liquid of a depth greater than the thickness of a doughnut, means for causing flow of the cooking liquid along said channel, a reticulate drop plate in said channel disposed below the level of the cooking liquid and spaced from said bottom, a dam beneath said drop plate operating to force the cooking liquid upwardly through said drop plate, means for by-passing a portion of the cooking liquid past said dam, and means for depositing raw doughnuts in the cooking liquid above said drop plate.

9. In a doughnut machine means forming a channel for the reception of a cooking liquid, means for causing flow of the cooking liquid along said channel, means for depositing raw doughnuts in the flowing cooking liquid and a baffle disposed in advance of the locality of deposit of doughnuts in the channel and extending above the lowermost portions of the doughnuts when in their lowermost positions.

10. In a doughnut machine means forming a channel for the reception of a cooking liquid, means for causing flow of the cooking liquid along said channel, means for depositing raw doughnuts in the flowing cooking liquid and a reticulate baffle disposed in advance of the locality of deposit of doughnuts in the channel and extending above the lowermost portions of the doughnuts in their lowermost positions.

11. In a doughnut machine, means forming a channel for the reception of a cooking liquid, flow propulsion means for causing flow of the cooking liquid along said channel, dough depositing means for depositing dough formations in the channel at one locality therein, turnover means for turning over the doughnuts at another locality in the channel, flow controlling means in the channel extending for a portion of the length of the channel in advance of the turnover means, and including a drop plate for dividing the channel into upper and lower passageways, said dough depositing means depositing the dough formations in the upper passageway and above said drop plate, said flow propulsion means causing flow of the cooking liquid first into the lower passageway and from the lower passageway into the upper passageway, said flow controlling means controlling the rate of flow of the cooking liquid in the channel to provide a relatively slow flow in the upper passageway and over the drop plate and a relatively fast flow through the turnover means.

PETER J. TOEWS.